(No Model.)
R. W. WILLSON.
CLOCK FOR MAKING ELECTRIC SIGNALS.
No. 267,299. Patented Nov. 7, 1882.
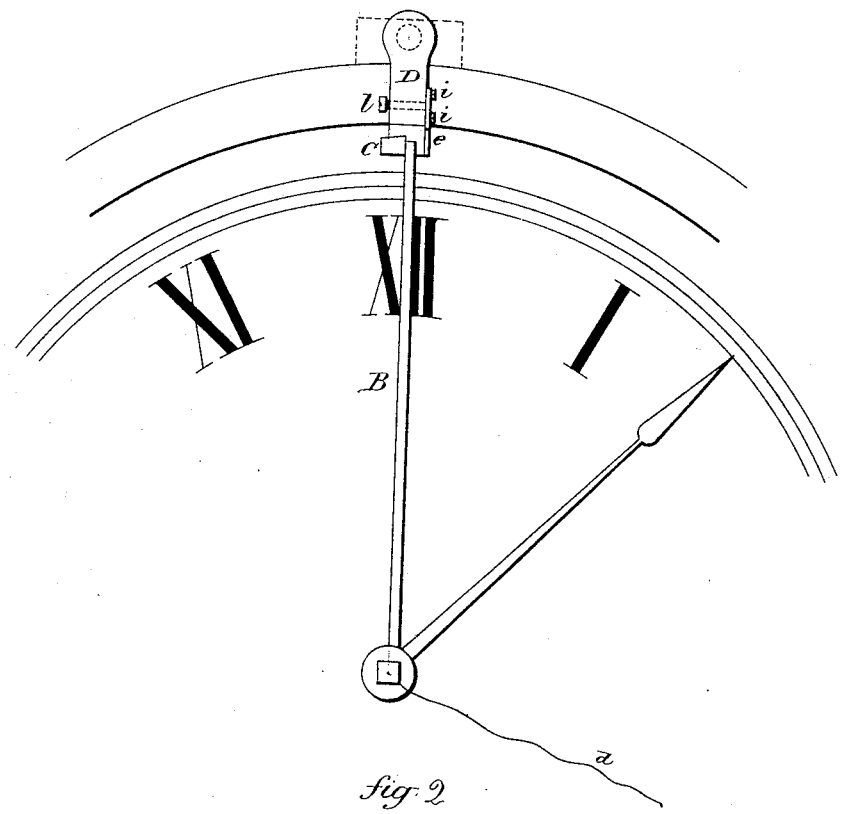
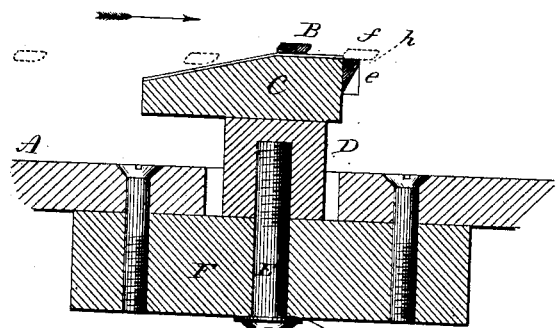
Witnesses. Robert W. Willson, Inventor.

UNITED STATES PATENT OFFICE.

ROBERT W. WILLSON, OF NEW HAVEN, CONNECTICUT.

CLOCK FOR MAKING ELECTRIC SIGNALS.

SPECIFICATION forming part of Letters Patent No. 267,299, dated November 7, 1882.

Application filed June 14, 1882. (No model.)

*To all whom it may concern:*

Be it known that I, ROBERT W. WILLSON, of New Haven, in the county of New Haven and State of Connecticut, have invented new Improvements in Clocks for Making Electrical Signals; and I do hereby declare the following, when taken in connection with accompanying drawings and the letters of reference marked thereon, to be a full, clear, and exact description of the same, and which said drawings constitute part of this specification, and represent, in—

Figure 1, a front view of a portion of a clock-dial to illustrate the invention; Fig. 2, a transverse section enlarged; Fig. 3, a modification.

This invention relates to an improvement in clocks for making electrical signals at a predetermined time or times.

It is a common and well-known device in connection with clocks whereby at a certain time one of the pointers to which one of the wires of a circuit is connected is brought into contact with a metal surface in connection with the other wire, and so as to complete the circuit, and that while the pointer is in connection with this said surface and the circuit closed the signal will continue; but a difficulty is experienced in this class of signals because of the variableness in the time at which the circuit is closed or broken, owing to the imperfect approach of the pointer to and escapement from the said circuit-closing surface. In the usual devices it is impossible to adjust this surface so as to make the time of the signal longer or shorter.

The object of my invention is to overcome these difficulties; and it consists, first, in arranging the surface upon which the circuit is completed with relation to the pointer, so that contact between the pointer and the surface will be sudden and instantaneous, and its escape therefrom alike sudden and instantaneous; and, also, in making the said surface adjustable as to its extent, as more fully hereinafter described.

A represents the clock-dial; B, the pointer by which the contact is made. This may be one of the pointers of the clock or an independent pointer. In the path of the pointer and at a point where the signal is to be given— say at twelve o'clock—I arrange a block, C, of ebonite or other suitable non-conducting material, secured to the dial or to some permanent part of the clock, as seen in Fig. 2. As here represented, the block C is attached to a metal piece, D, and that piece secured, say, by a screw, E, insulated from the dial-plate, or that part of the clock-movement with which the pointer is in connection, (here represented as by an ebonite block, F, on the rear of the plate A.) The front surface of the block C is inclined, as seen in Fig. 2, and so that the pointer B, as it approaches that surface, will ride up the incline, as seen in Fig. 2, and thus be thrown out of its ordinary plane of movement.

On the side of the metal piece D to which the block C is attached is a metal arm, e, its surface standing a little below the front face of the block C. The pointer B rides over the block C until it comes to the opposite edge, and until it can escape from the surface of the block. So soon as it escapes from that surface it springs down or backward, and into contact with the arm e, as seen in broken lines at f, Fig. 2. One wire, a, is in connection with the arm e, (here shown as through the screw E,) by which the metal piece D is secured to the plate A. The other wire, d, comes to the central shaft or to other point of the clock, so that the pointer B becomes a continuation of that line. As the pointer strikes the surface of the arm e the circuit is closed, and will remain so as long as the pointer is in contact with that surface. The outer edge of the arm is made very thin by under-cutting, as seen in Fig. 2, and the rear edge of the pointer is correspondingly beveled or cut. Hence as soon as the rear edge of the pointer arrives at the edge of the arm e it will spring backward, as seen at h, Fig. 2, and, owing to the corresponding incline of the pointer and the arm e, the escape of the pointer takes it instantly away from the surface of the arm, so that there is no dragging or delay in the breaking of the circuit. Owing to this springing out of the pointer by means of the block C, and arranging the arm e in rear of the face of the block, the escapement of the pointer from the block or insulated surface onto the arm e is instantaneous, and without any dragging or retarded effect, and the closing of the circuit is alike instantaneous and complete. The arm $e$ is made adjustable on the metal piece D, so as to be moved nearer to or farther from the block or point where the circuit is closed. This may be done by means of two screws, $i\ i$, through the arm into the piece D, and intermediate screw, $l$, from the opposite side bearing against the plate, so that by loosening the screws $i\ i$ and driving in the screw $l$ the arm will be correspondingly moved away from the point of the block C where the pointer escapes, or vice versa. The farther the outer or escapement edge of the arm $e$ is from the block or point where the circuit is closed the longer will be the time of the closed circuit, and consequently the longer the signal. This adjustment of the arm $e$ may be made in various ways; but this illustration will be sufficient to enable those skilled in the art to apply other means of adjustment.

The metal surface with which the pointer comes in contact to complete the circuit may be made in two parts, as seen in Fig. 3, $n$ representing the one part and $m$ the other part, the one adjustable with relation to the other—say as by means of a leading-screw, $r$, in the base of the part $m$ working through the part $n$—so that as the pointer passes onto one it makes the connection and reaches the other part, $n$, before it passes from the first part, $m$, and thus maintains the circuit so long as the pointer is passing from one side of the part $m$ to the opposite side of the part $n$, it being understood that at no time must the distance between the two parts $n\ m$ equal the width of the active part of the pointer which is brought into connection therewith.

I claim—

1. In a clock for making electrical signals, the combination of the pointer in connection with one wire of a circuit, and a metal surface in connection with the other wire of the same circuit, and with which surface the pointer is brought into contact to close the circuit, said surface made adjustable as to duration of contact with the said pointer, substantially as described.

2. In a clock for making electrical signals, the combination of an insulated block presenting a surface inclined to the path of the pointer which is to complete the circuit, and up which incline the pointer will ride, with a metallic surface adjacent to the said insulated block in connection with one wire, the pointer being in connection with the other wire, said metallic surface arranged below the surface of the said insulated block over which the pointer passes, and so that as the pointer escapes from the said insulated block it will fall or be forced upon the said metal surface and complete the circuit, substantially as described.

3. In a clock for making electrical signals, the combination of an insulated block presenting a surface inclined to the path of the pointer which is to complete the circuit, and up which incline the pointer will ride, with a metallic surface adjacent to the said insulated block in connection with one wire, the pointer being in connection with the other wire, said metallic surface arranged below the surface of the said insulated block over which the pointer passes, and so that as the pointer escapes from the said insulated block it will fall or be forced upon the said metal surface and complete the circuit, the said metal surface adjustable with relation to said block, whereby the time of contact between the pointer and said surface may be varied, substantially as described.

4. In a clock for making electrical signals, the combination of an insulated block presenting a surface inclined to the path of the pointer which is to complete the circuit, and up which incline the pointer will ride, with a metallic surface adjacent to the said insulated block in connection with one wire, the pointer being in connection with the other wire, said metallic surface arranged below the surface of the said insulated block over which the pointer passes, and so that as the pointer escapes from the said insulated block it will fall or be forced upon the said metal surface and complete the circuit, the escapement side of the said metal surface inclined or undercut, substantially as described.

5. In a clock for making electrical signals, the combination of an insulated block presenting a surface inclined to the path of the pointer which is to complete the circuit, and up which incline the pointer will ride, with a metallic surface adjacent to the said insulated block in connection with one wire, the pointer being in connection with the other wire, said metallic surface arranged below the surface of the said insulated block over which the pointer passes, and so that as the pointer escapes from the said insulated block it will fall or be forced upon the said metal surface and complete the circuit, the escapement side of the said metal surface inclined or undercut, and the escaping side of the pointer correspondingly inclined, substantially as described.

ROBERT W. WILLSON.

Witnesses:
Jos. C. Earle,
J. H. Shumway.